Figure 1:
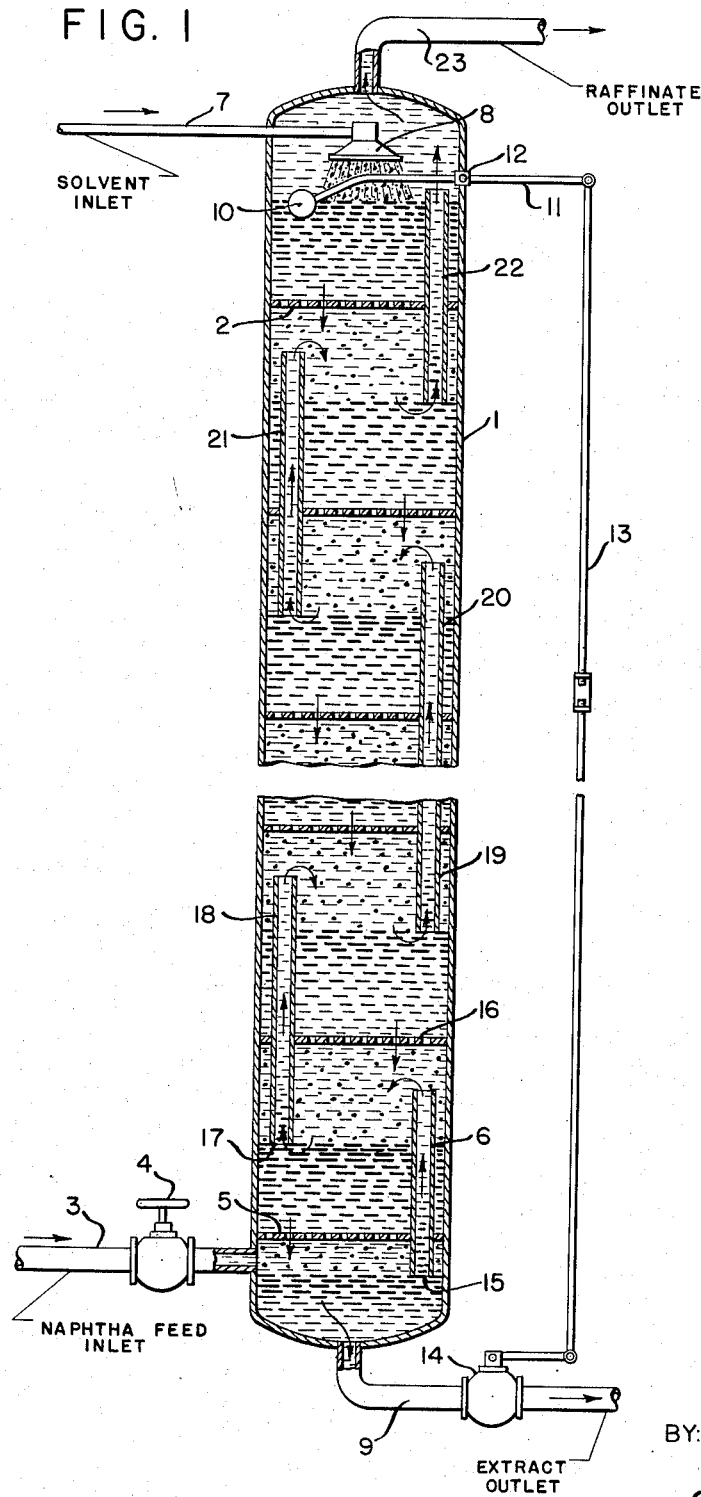

Aug. 4, 1953

G. R. GRUNEWALD ET AL 2,647,856

APPARATUS AND PROCESS FOR COUNTERCURRENT
LIQUID-FLUID EXTRACTION

Filed June 9, 1952

2 Sheets-Sheet 1

INVENTORS:
GLEN R. GRUNEWALD
FRED J. PIERCE

BY: Chester J. Giuliani
Donald E. Moehling
ATTORNEYS

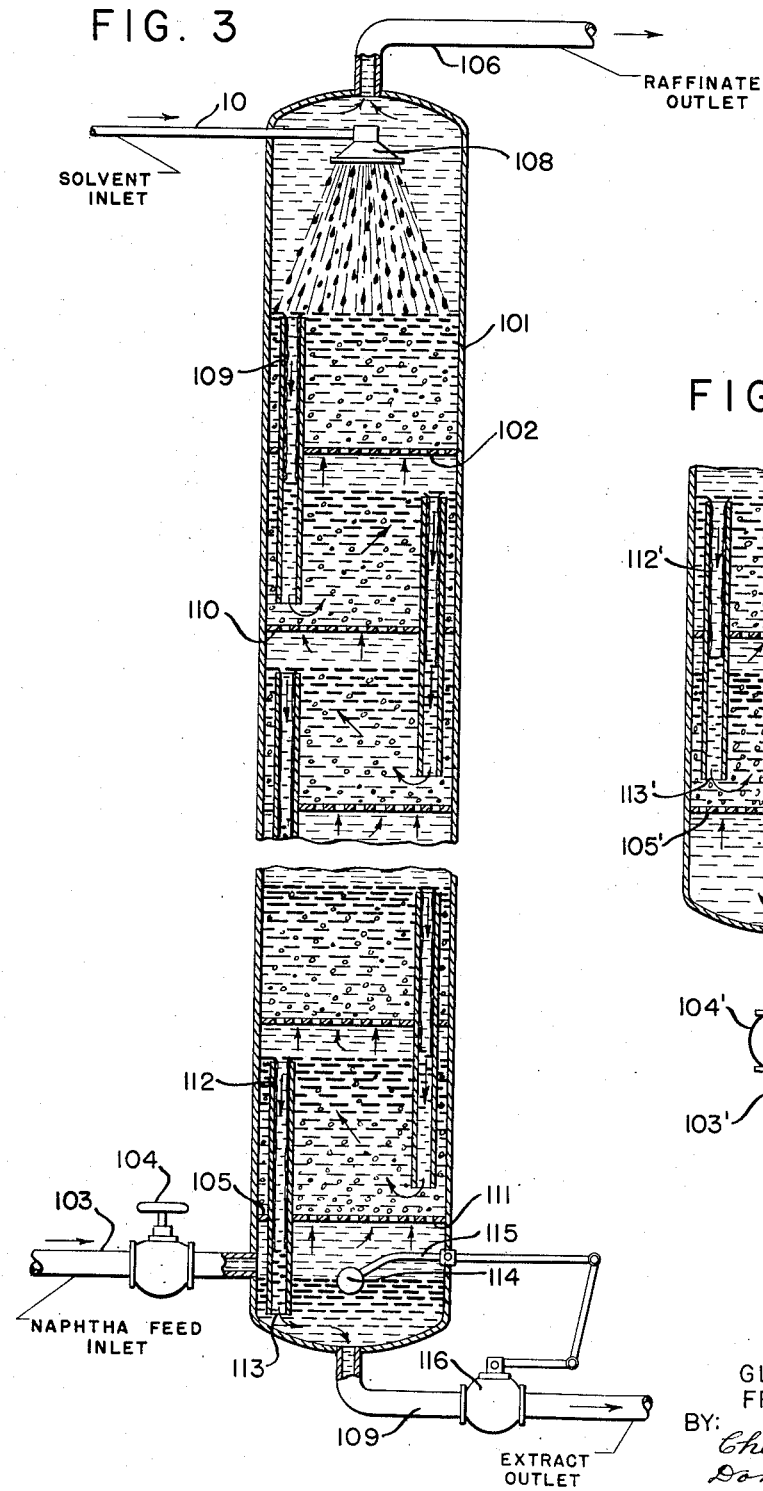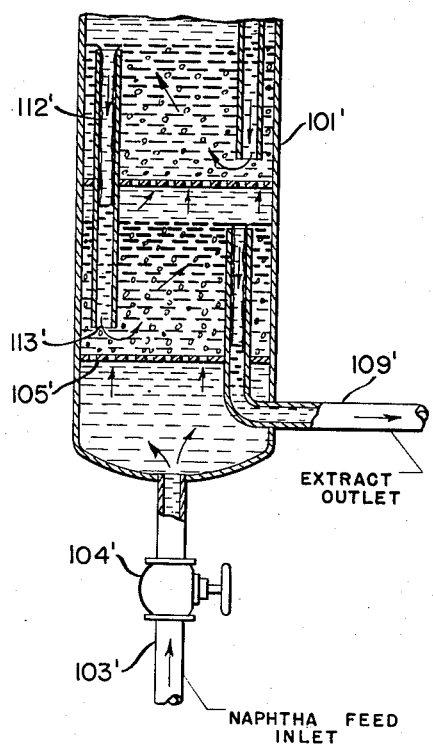

UNITED STATES PATENT OFFICE 2,647,856

APPARATUS AND PROCESS FOR COUNTER-CURRENT LIQUID-FLUID EXTRACTION

Glen R. Grunewald, Chicago, and Fred J. Pierce, La Grange, Ill., assignors to Universal Oil Products Company, Chicago, Ill., a corporation of Delaware Application June 9, 1952, Serial No. 292,494

7 Claims. (Cl. 196—14.41)

This application is a continuation-in-part of our copending application Serial No. 250,696, filed October 10, 1951.

This invention relates to a countercurrent extraction or contacting process and to a particular device for dispersing one of the fluid phases in countercurrent contact with the other phase. More specifically, the invention concerns a liquid-liquid or liquid-gas countercurrent solvent extraction or absorption column containing superimposed perforated plates therein and having a single liquid level control device on one of the plates thereof with means cooperating between said plate and the other plates in the column for maintaining the interface between the fluids on said other plates at a constant level.

The apparatus of this invention provides a solution for one of the major problems associated with the operation of present countercurrent extraction columns utilizing sieve-deck trays and a liquid as at least one of the fluid phases in the column. These problems primarily arise from the difficulty of concurrently maintaining the interface between the fluid phases on all of the sieve-deck trays within the column at a constant level during the extraction, a condition which is essential for satisfactory operation of the extraction column. In most sieve-deck columns of recent design the column is difficult to control and in many cases operates in the absence of a second phase on one or more of the trays, particularly when some of the tray perforations become clogged during operation, resulting in a large loss of column efficiency. The apparatus of this invention is particularly adapted for maintaining a constant interface level on all of the plates in the column, thus maintaining uniform equilibrium conditions on all of the plates and resulting in operation of the column at maximum efficiency during the entire period of operation.

An object of this invention is to provide a multiple perforated plate extraction column capable of maintaining the liquid interface between the light and dense phases on all plates within the column at a constant level.

Another object of this invention is to provide a liquid-liquid or liquid-gas extraction apparatus wherein more efficient contact of raffinate and extract phases and greater control of the flow of said phases is obtained, thereby yielding improved separation results.

In one of its embodiments the invention concerns a washing column for countercurrently contacting substantially immiscible fluids of different specific gravities, at least one of which is a liquid, in a plurality of superimposed contacting sections within said column, comprising a housing having a dense liquid inlet in the upper portion of said housing, a light fluid inlet below said dense liquid inlet, a dense liquid outlet in the lower portion of said column, a light fluid outlet in the upper portion of said column, a plurality of substantially horizontally disposed perforated partitions in said housing which form a plurality of superimposed contacting sections a conduit extending substantially vertically through each of said partitions comprising a riser portion above said partition terminating below a super-adjacent partition and a downcomer portion below said partition terminating above a sub-adjacent partition, said downcomer portion of the conduit in any particular partition extending to a level below the riser portion of the conduit in a sub-adjacent partition, and a liquid level control means in said column which operates in response to the interface level in one of the contacting sections of said column.

Another embodiment of this invention relates to a process for countercurrently contacting fluids of different specific gravities not wholly miscible with each other at least one of which is a relatively denser liquid, in superimposed fluid-liquid contacting zones, each of said zones comprising a lower relatively dense liquid layer and an upper relatively light fluid layer separated from said dense liquid layer by an interface therebetween, said process comprising introducing said heavy liquid into the uppermost contacting zone, introducing light fluid into a contacting zone below said uppermost zone, accumulating said dense liquid in a layer above an adjacent lower zone, accumulating light fluid in a layer above said dense zone, redistributing one of said fluids as a discontinuous stream through the other fluid, conducting said other fluid in a continuous, confined stream from an interface in one of said contacting zones into one of the fluid layers in an adjacent contacting zone, controlling the interface between the light fluid and dense liquid in one of said contacting zones at a constant level, withdrawing light fluid from above the interface in the uppermost zone and withdrawing dense liquid from below the interface in the lowermost zone.

Other objects and embodiments of the present invention relating to specific aspects thereof and to various alternative modifications in the process and apparatus of the present invention will be further described in the specifications which follow.

The present invention provides an improved apparatus and process for operating a countercurrent fluid-fluid contacting or extraction process wherein a liquid of higher density is passed through a fluid, either liquid or gaseous, of lower density in finely divided droplet form and in multiple contacting zones distributed throughout the length of a vertical extraction column and separated by vertically spaced perforated plates through which either the light or the heavy fluid phase is conducted. The apparatus and process provide a means for maintaining the interface between the two substantially immiscible fluid layers on each of the perforated plates at a substantially constant level by controlling the level of the interface between the fluids on one of the plates in the column with the aid of a level control device which adjusts the rate of flow and pressure relationships in each of the contacting zones whereby the interface level in all of the zones is simultaneously maintained substantially constant. The apparatus and process are particularly adapted to the extraction of a specific component or a class of components from a selected charging stock utilizing a solvent which is selective for the component or class of components to be recovered. The apparatus and process may also be used for countercurrently washing one liquid with another liquid to remove certain impurities or to recover certain components therefrom, the liquids being substantially immiscible in each other and of different specific gravities. A further adaptation of the present process and apparatus is exemplified by countercurrently washing a gaseous stream with a liquid solvent to recover or remove a particular component, such as a liquid fog or vapor from the gas. It is an inherent qualification in fluid-fluid extraction, of course, that the component to be recovered be more soluble in the extractive solvent than the remaining undesired component or components accompanying the former in admixture therewith. Thus, the system may be utilized to recover liquid aromatic hydrocarbons from liquid hydrocarbon charging stocks, such as petroleum fractions containing paraffinic, olefinic and/or naphthenic hydrocarbons in addition to the aromatic component to be recovered; for the removal by washing of undesired components from gasoline boiling range fractions, such as the removal of phenolic compounds and/or sulfur-containing compounds such as mercaptans from gasoline stocks utilizing an aqueous caustic solution as the extracting agent; for the washing of gaseous mixtures with a liquid solvent for one or more of the components of the gas, as for example, in the removal of sulfur dioxide from an air mixture therewith; for recovery of metallic salts, such as silver and mercury salts from aqueous solutions utilizing a water-immiscible solvent for the salt, such as carbon disulfide; and for other uses in which countercurrent, fluid-fluid contacting or extraction is desired for the separation of a particular component of one of the fluids. Suitable solvents for the purpose may be characterized generally as any gas or liquid which is selectively miscible with the component or components of the feed stock mixture to be recovered or removed therefrom. Thus, for example, selective solvents for aromatic hydrocarbons and in which paraffinic hydrocarbons are not soluble to the same extent are such organic liquids as furfural, phenol, the glycols, such as oxydiethylene glycol, dioxytriethylene glycol, oxydipropylene glycol, $\beta$, $\beta'$-dioxydipropionitrile, etc. Water is a common solvent for the extraction of metallic salts from organic media and may be utilized as a selective solvent therefor. Aqueous caustic solutions or aqueous amines may be utilized as extractive solvents for phenols, etc.

The apparatus of the present invention and alternative methods for effecting the general process of the invention are further illustrated and described in Figures 1, 2, 3 and 4 of the accompanying drawings which depict a vertical tubular tower containing multiple liquid-liquid contacting zones in each of which a liquid interface is maintained, said liquid-liquid extraction comprising one of the preferred systems to which the present apparatus may be applied. Although the process and apparatus of this invention are particularly effective for the recovery of one or more hydrocarbon components from a liquid hydrocarbon feed stock utilizing a liquid solvent or extractant, the feed stock may also consist of any other liquid mixture of separable components or a normally gaseous feed stock of such components which may be subjected to absorption in the gaseous condition in a liquid solvent or which may be liquefied at suitable operating pressures and temperatures adapted to the present apparatus and thereafter subjected to solvent extraction. For the sake of simplicity of description, the method of extraction is described with reference to a feed stock comprising a liquid petroleum naphtha fraction boiling in the range in which the azeotropes of a specific aromatic hydrocarbon are present, such as benzene (the hydrocarbon azeotropes of which boil within the range of from about 65° to about 81° C.) and utilizing as a selective solvent for the benzene component an aqueous oxydiethylene glycol solution. The solvent in this case being the denser of the two liquid phases ultimately present within the column, is introduced into the top of the column in accordance with the process of this invention. The solvent, however, may also consist of other liquid or liquefiable compounds suitable for the purpose and may have either a higher or lower specific gravity than the feed stock and thus may be introduced into the extraction column either into the upper or lower portion thereof.

Referring to Figure 1 of the diagrammatic drawing, the extraction column comprises, in general, a vertical housing 1 in the form of a generally vertical tubular column containing multiple, substantially horizontally disposed perforated plates spaced vertically within and attached to the inner circumferential surface of the column, as for example, sieve deck 2 comprising the uppermost plate in the extraction column. Each plate separates a contacting zone in which a relatively dense liquid phase is countercurrently conducted in the form of finely divided droplets through a light fluid phase, which in the description of the present drawing is a relatively light liquid hydrocarbon. Although the diagram illustrates a sieve-deck as one of the alternative embodiments of the perforated partitions separating the multiple contacting zones within the housing which are spaced vertically in the extraction column housing, the perforated partition may also comprise one or more bubble decks commonly employed in extraction columns of the type illustrated. In the lower portion of the extraction column, preferably below the lowermost perforated plate thereof, a conduit 3 connects to the column for admitting feed stock therein, which in the present description is the naphtha fraction of a petroleum distillate. The naphtha inlet rate of flow must be a finite value, however small, up to a value less than that sufficient to establish a differential in pressure of the light fluid below each partition greater than the head of heavy fluid above each partition and may be controlled to obtain any desired degree of extraction by an appropriate flow control device, such as valve 4 in the illustration. The feed stock introduced into the column through conduit 3, accumulates in a layer below the perforated partition in the lower portion of the column such as plate 5 and eventually flows upwardly in the column in a confined stream, for example, through conduit 6 comprising a downcomer in the lower portion thereof below the riser in its upper portion above the partition 5. It is evident that the downcomer projects downwardly through the light hydrocarbon phase of a sub-adjacent contacting zone and the riser portion projects upwardly into the light hydrocarbon phase above the perforated partition 5. When the column is initially put into operation, the naphtha feed stock is preferably run into the column until the entire column is filled with feed stock, and thereafter the solvent is introduced until equilibrium is established between the respective solvent and feed stock streams, as hereinafter described.

The solvent, which for the purpose of illustrating a typical extractant utilizable in the present apparatus and process in an aqueous oxydiethylene glycol, preferably containing an amount of water sufficient to provide a selective or preferential solvent for the aromatic hydrocarbon components of the feed stock, but not for other hydrocarbons present which may likewise accompany the aromatic components in the naphtha. For oxydiethylene glycol, the amount of water which provides a particularly preferred selective solvent for the aromatic hydrocarbons is from about 5 to about 15% by weight of the aqueous glycol, the solvent being introduced through a solvent inlet in the upper portion of the extraction column, such as solvent inlet conduit 7. When the solvent is the denser of the two fluid phases introduced into the extractor column and the process is operated with the dense phase being the dispersed or discontinuous phase in the extractor, the solvent inlet conduit is above the uppermost perforated partition of the column. Solvent inlet conduit 7 may have a spray head 8 attached to the end of the conduit within the column for comminuting the liquid stream into finely divided droplets, thereby increasing the interfacial area of contact between the solvent and feed stock or raffinate phase when the solvent is initially charged into the extraction column. The flow rates of solvent and feed stock into the column are determined by the withdrawal rates of the raffinate and extract phases from the column through their respective outlet ports, which, in turn, are dependent upon the purity and percentage recovery of the aromatic product desired from the feed stock. It is, of course, essential to continuous operation of the column that the pressure on the light fluid entering the bottom of the column exceeds the hydrostatic pressure of the dense and light liquids in the superimposed contacting zones above the feed inlet, plus the pressure drop due to flow resistance in the column. The raffinate comprising the phase of least specific gravity in the upper portion of each of the multiple liquid-fluid contacting zones above each perforated partition and comprising the residue of the feed stock after removal of at least a portion of the aromatic hydrocarbons therein is conducted upwardly through the downcomer and riser conduits extending through each of the perforated partitions until the space above the uppermost plate 2 in the column is reached where the raffinate accumulates and is withdrawn from the column at a controlled rate.

A liquid level control device in the uppermost contacting zone of the extraction column is provided in the embodiment of the invention illustrated in Figure 1 in order to control the interface level between the dense liquid and light fluid phases in the contacting zone on the top plate of the column. By maintaining the interface level constant on the top plate of the column, all of the interface levels on each of the lower plates in the column are also controlled at the constant level; hence the level control is preferably on the uppermost plate to obtain maximum effect of the trays provided in the column; although the interface level control may be placed in a contacting section on a lower plate within the column, such an arrangement obviously provides no advantage in a multiple-tray column, since the control device exerts no interface level control in any contacting zone above the zone in which the device is placed. The interface level varies directly with the extract rate of flow from the column, since the removal of dense phase extract from the bottom of the column reduces the internal pressure within the column against the dense fluid above the perforations in the plate immediately above the extract outlet, that is, plate 5, and allows more of the dense fluid above plate 5 to flow through the perforations. As the level of dense fluid on plate 5 falls, the drop in pressure is transmitted through each of the perforated plates above plate 5, including uppermost plate 2, causing a simultaneous flow of dense liquid through the perforations in all of the plates and lowering the interface level on plate 2. As the interface level on plate 2 falls, the interface level sensing device in the contacting zone on plate 2 actuates an extract flow control device on the extract outlet, conduit 9, either allowing a greater or lesser volume of extract to be withdrawn from the column and thereby re-establishing the equilibrium pressure relationships within the column.

The interface level in the contacting zone above perforated partion 2 may also be maintained constant by controlling the rate of flow of solvent into said contacting zone on the uppermost plate 2 and the latter comprises an alternative, although less preferred, means of maintaining the interface levels in each of the contacting zones within the column at a constant level.

The liquid level control device illustrated in Figure 1 and placed at the interface on the uppermost plate 2 comprises an interface level sensing element such as ball float 10 attached to a lever arm 11, pivotally connected to the column housing at a fulcrum point 12, the arm 11 protruding from the column housing and connecting outside of the column, beyond the fulcrum to a connecting rod 13 which actuates a suitable solvent inlet or extract outlet flow control means, such as extract outlet valve 14, the connecting rod raising or lowering the valve seat in valve 14, thereby determining the flow of extract from the extraction column in response to the rise and fall of the interface level between the dense liquid and light fluid on the uppermost plate of the column and in cooperation with the ball float sensing element at the interface on said plate. In the operation of the column wherein the interface level control on the uppermost plate is determined by control of the extract outlet rate of flow, the naphtha feed stock rate and solvent inlet rate of flow are controlled at a predetermined valve for obtaining a certain desired recovery of aromatic hydrocarbon. Any rise of the interface level in the uppermost contacting zone on plate 2, due to the accumulation of dense or lower phase on the plate, causes in response thereto the interface level sensing element (ball float 8) to rise, which in turn forces connecting rod 10 downwardly and opens extract outlet valve 4. The latter permits an additional quantity of extract to flow from the column through conduit 9 and re-establishes the equilibrium pressure within the column. In the actual operation of the column, the rise and fall of the interface levels on each of the perforated plates is relatively minute and the pressure variations within the column fluctuate through a very narrow range; the flow of dense phase through the perforations on each of the plates is at a substantially constant rate when the column is in equilibrium; the flow of solvent and feed stock through their respective inlet conduits into the column is continuous; the flow of raffinate from the column is constant and continuous; valve 14 opens and closes only partially to accommodate the slight pressure variations and the flow of extract from the column is therefore substantially constant and continuous; the entire column appears to be in balanced operation. It is characteristic of the operation of the column that the rate of transfer of both dense and light liquids between each of the plates is uniform and the total amount of both dense and light fluids exchanged between the contacting zones on each plate is uniform throughout the column. Although the size and number of perforations in each plate is desirably the same for all of the plates in order to provide maximum efficiency of extraction, the fact that one or more of the perforations in one or more of the sieve decks becomes clogged does not interrupt the operation of the column or cause a diminution of either of the fluid layers above any of the plates, the rate of flow through the remaining perforations automatically being increased to compensate for the loss in flow through the clogged perforation or perforations.

The length of the conduit extending through each of the perforated plates, from the contacting zone below each partition into the contacting zone above each partition, determines the position of the interface between the dense liquid and light fluid on each of the plates, except the uppermost plate 2, which interface is fixed by the response of the dense liquid flow control means in either the dense liquid inlet or outlet conduits to an interface level sensing element in the contacting zone on said plate 2. The series of separate conduits present in the column in essence are downcomers below each of the perforated partitions and upcomers or risers above each of the perforated partitions. The perforated partitions in effect act as redistributing means for the phase (either the light or heavy fluid) passing through the perforations in a discontinuous stream and thus contain as many perforations as possible, consistent with the formation of discrete droplets of the discontinuous phase, in order to effect maximum countercurrent distribution of the discontinuous stream in the continuous phase as possible.

In the embodiment illustrated in Figure 1 in which the heavy fluid (solvent) is the discontinuous stream, the hydrocarbon phase below plate 5 in the lower portion of the column flows from the naphtha feed inlet conduit 3 across the path of the descending droplets of solvent or discontinuous extract phase formed by the perforations in plate 5, through the opening 15 in the lower downcomer portion of conduit 6, and upwardly through riser 16 in preference to the perforations in plate 5, due to the difference in hydrostatic head of the fluid in riser pipe 6 and the layer of relatively more dense solvent phase above the perforations in plate 5. The hydrocarbon phase thereafter flows out of the top of the riser portion of conduit 6, into the light phase layer above plate 5, across the column in contact with the droplets of solvent dropping through the perforations in superadjacent partition 16, into the opening 17 at the end of conduit 18 and into the light phase layer of the contacting zone above plate 16. The light phase outlet openings in the riser pipes such as 6 and 18 which extend into the upper layer hydrocarbon phase of the contacting zones is preferably as high above the level of the interface between the hydrocarbon and extract phases as possible to permit maximum contact between the downwardly flowing finely divided droplets of glycol extractant and the hydrocarbon phase which constitutes the continuous phase in the embodiment of the invention illustrated by Figure 1. The light phase outlet openings of the risers in any particular contacting zone are preferably on the side of the column opposite to the side on which the light phase inlet openings of the risers are located, to permit transverse flow of the light phase (hydrocarbon) across the region of descending droplets of redistributed extractant falling downwardly from the superadjacent perforated plates into the extract layer, thereby providing an increased area of contact between the hydrocarbon and extractant phases and increasing the efficiency of extraction. In a similar manner, the light hydrocarbon phase flows upwardly through the column through conduits 19, 20, and 21, eventually flowing through the light phase inlet opening in the downcomer portion of conduit 22, upwardly therein, past the spray head 8 and finally out of the top of the column into raffinate outlet conduit 23. The raffinate may be sent to storage or into a series of succeeding extraction columns as the inlet feed stock thereto for further extraction of the aromatic components therefrom, if incomplete in one column or for the removal of other components therefrom in succeeding extraction columns which may employ other selective solvents, as desired. As a result of the enhanced efficiency of the present extraction procedure, however, the raffinate outlet removed from the column through conduit 23 consists essentially of paraffinic hydrocarbons, naphthenic hydrocarbons, and olefins when the charging stock to the column is a petroleum naphtha fraction containing the above classes of hydrocarbons and when a sufficient number of perforated plates are present in the extraction column to effect the desired degree of separation. In thus flowing upwardly through the column, the light fluid filling the riser tube and extending from the upper light fluid phase in a contacting zone above one of the perforated plates to the light fluid phase of a superadjacent plate provides the continuous phase through which the relatively heavy liquid extractant is passed in droplet form, the extract or solvent phase thus comprising the discontinuous phase present in the extraction column.

Figure 2:
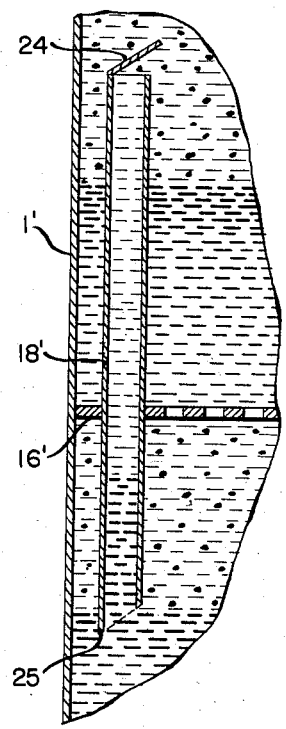

One of the preferred designs for the conduits extending between the perforated partitions of the present extraction or contacting column is illustrated in Figure 2 of the accompanying drawing which represents a cut-away section of a typical extraction column. The preferred design illustrated comprises a housing 1', a conduit 18' comprising the upper riser portion above the perforated partition on plate 16', and a lower downcomer portion extending below the plate 16' a substantial distance, the latter plate being fastened to the inside surface of housing tube 1'. The riser pipe 18' has a baffle member 24 placed over an orifice in the upper portion of pipe 18', as for example, over the top end of the pipe to allow the rising hydrocarbon phase to flow through the riser, but also spaced sufficiently close to the top, open end of conduit 18' to prevent any substantial proportion of the descending redistributed dense phase solvent to enter the riser conduit. Baffle member 24 may simply be a tipped cap, as illustrated in Figure 2, fastened on one of its edges of riser pipe 18'.

A further improvement in the design of the downcomer portion of the conduit 18' is the angular termination of the light fluid inlet end of the conduit, the lowermost tip 25 of the conduit thereby extending into the dense phase on a subadjacent plate; that is, below the interface between the light and heavy fluids on the perforated partition. The opening defined by the bottom of the pipe thus extends across the interface and permits the segregation of the light fluid from the dense liquid phase prior to the upward flow of the light fluid into the conduit 18'. When the inlet end of the conduit terminates at right angles to the vertical pipe, the riser opening is on the same plane as the interface and if there is any tendency for the dense phase (solvent in this illustration) to emulsify with the feed stock, the turbulence at the opening of the conduit due to flowing around the edge of the tube increases the tendency toward emulsification, particularly when the light phase rate of flow is high. The dense phase therefore tends to accompany the light phase up the conduit, thereby decreasing the differential in head between the column of fluid in the conduit and the column of combined heavy and light fluid above the perforated partition, the latter differential being essential to proper operation of the column. The present design of the downcomer portion of the conduit tends to reduce emulsification, thereby obviating the variation in density of the fluid in conduit 18' due to excessive inclusion of solvent therein.

In the normal operation of the present extraction or contacting column utilizing a fluid-liquid system of feed stock and solvent, at least a portion of the dense liquid phase in the column tends to rise in the conduit as the result of the aforementioned tendency of most solvents to emulsify with the feed stock (particularly with liquid feed stocks) as well as the tendency of the dense liquid phase to be entrained in the light fluid as the latter enters the relatively constricted opening in the conduit where the velocity of flow is greater. In addition to these factors, the dense fluid at the interface operates as a seal of the lower conduit opening which is broken only when the accumulation of light fluid phase above the interface (below the perforated partition) increases the downward pressure on the dense fluid phase sufficiently to force the interface below the light fluid inlet opening in the conduit. In response to this constant downward pressure on the heavy liquid interface, the heavy liquid partially fills the conduit, tending to decrease the differential between the head of the column of fluid over the perforated partition and the head of the column of fluid in the conduit. It is only when the pressure of the light phase on the bottom of the perforated partition is greater than the head of combined heavy and light phases on the top of the perforated partition, as for example, when the feed stock charging rate is increased excessively, that the column becomes inoperative and the light phase is forced upwardly through the perforations rather than upwardly through the conduit and out of the top thereof.

The washing column is illustrated in Figure 1 as having a dense liquid flow control means in the dense liquid oulet conduit which responds to the interface level control means in the uppermost contacting zone of the column and although it is generally preferred to thereby control the interface level by controlling the flow rate of extract phase from the column, as illustrated in Figure 1, similar control of the interface levels in each of the contacting zones within the column may be obtained by a flow control means in the dense inlet conduit. The interface level sensing means in the uppermost contacting zone on the top perforated partition of the column in this latter alternative arrangement connects with the flow control means in said dense liquid inlet conduit and the flow of dense liquid into the column is controlled in response to the flow control impulses from said interface level sensing means.

An alternative process and apparatus comprising other embodiments of this invention, for effecting the extraction of a liquid or gaseous feed stock mixture containing at least two components utilizing a liquid solvent only partially miscible with the feed stock by countercurrent contact of said liquid and fluid phases is illustrated in Figure 3 of the accompanying drawings. The apparatus is essentially similar in most respects to the extraction column illustrated in Figure 1 described above but in which embodiment the dense liquid phase comprises the discontinuous stream redistributed within the column through the perforated partitions comprising the column. In the embodiment illustrated in Figure 3, the light phase, either gaseous or liquid, is passed in redistributed or comminuted form upwardly through the column, the redistribution of the light phase being effected by means of superimposed perforated partitions spaced vertically in substantially horizontal arrangement within the column, as described above for Figure 1.

In the alternative means of operating the present extraction process, the apparatus comprises a substantially vertical, tubular housing 101, containing a series of superimposed perforated partitions, the topmost partition or plate 102 in the column being shown as a sieve deck of conventional and common design. The light fluid introduced into the column is here illustrated as a naphtha fraction comprising a mixture of at least one aromatic hydrocarbon as the extractable component thereof, and one or more paraffinic and/or naphthenic hydrocarbons which do not dissolve appreciably in the solvent, the naphtha being introduced into the fluid-liquid contacting apparatus below the solvent or heavy phase inlet, as for example, through feed inlet conduit 103 in controlled amounts determined by valve 104. The light fluid feed stock to be separated in the extraction process flows upwardly in the column through the perforations in the lowermost perforated partition 105 at a rate which will effect redistribution of the feed in the solvent phase above the partition as discrete droplets. The pressure maintained on the feed stock is sufficient to force the liquid in comminuted form through the perforations in the sieve deck trays, a pressure sufficient to overcome the hydrostatic head above the lowest plate 105. The droplets rise to the top of the layer of heavy liquid residing on tray 105 and eventually combine to form a light fluid layer above the liquid-liquid interface in the contacting zone above said tray. In a similar manner, the light liquid phase rises through successive superadjacent perforated partitions as a discontinuous stream, that is, in redistributed, comminuted form, through the topmost tray 102 in the column and is eventually removed from the column through raffinate outlet 106, above the solvent or heavy liquid inlet 107 in the upper portion of the column, the raffinate comprising the non-extracted components of the feed stock.

The solvent (when the relatively heavy liquid charged to the column) is preferably introduced as a finely divided spray in the upper portion of the column, for example, through spray head 108. The solvent droplets flow countercurrently downward against the light fluid phase flowing upwardly from plate 102. The heavy liquid solvent accumulates on the uppermost perforated partition 102 until the level of the heavy liquid phase reaches the top of conduit 109 and thereafter flows in a confined stream over the wier provided by the top end of conduit 109, down the riser portion of tube 109, thereafter through the lower downcomer portion below perforated partition 102 and into the heavy liquid layer of the contacting zone above the subadjacent tray 110. The lower end of the conduit is preferably extended well below the interface between the light and heavy fluids on each subadjacent tray in order to permit separation of the light and heavy fluids normally present in the conduit as an emulsion formed by the turbulent mixing of the fluids flowing down the riser portion of the conduit. The heavy liquid settling to the bottom of the downcomer and flowing therethrough flows transversely across the column and thereby undergoes maximum countercurrent contact with the droplets of light fluid phase rising vertically through the substantially horizontally flowing heavy liquid extractant. The heavy liquid solvent thereafter flows through subadjacent contacting zones in a similar manner, eventually through the conduit extending through the lowermost perforated partition 111, that is, conduit 112, through the lower open end 113 of the conduit below the interface between the light and heavy fluids of the lowermost contacting zone and below the feed, or light fluid inlet.

The interface level in the lowermost contacting zone is desirably controlled at a substantially constant level, preferably below the bottom surface of partition 111, in order to prevent reduction in the efficiency of the column through loss of the lowermost contacting zone. Unless the interface level is controlled in the zone beneath the lowermost plate, the heavy liquid tends to accumulate in the lower portion of the column, eventually rising through superadjacent plates and filling the tower. Although resulting in greater efficiency in operating the column when provision is made for an interface level control in the lowermost contacting zone, such control is not essential to the process of the present embodiment, since the light fluid enters the lowermost zone under sufficient pressure to force its way upwardly through the perforations in the partitions, whether or not the heavy fluid completely fills the contacting zone. Because of the tendency of two liquids to undergo emulsification when one liquid is contacted with the other liquid in subdivided droplet state under conditions of relative flow therebetween, as in the present process, it is desirable to maintain a light fluid layer of substantial thickness above the heavy fluid layer in each contacting zone in order to provide two distinct phases into which the components of the liquid emulsion may transfer and separate. To obtain the maximum advantages of such emulsion separation, the interface and resulting fluid layers are provided in the lowermost contacting zone and in each superadjacent contacting zone above it. The interface level control device illustrated in Figure 3 comprises a heavy fluid level sensing element, such as the ball float 114 attached to arm 115 which is pivoted in the wall of the column housing. As the level of the interface between the light and heavy fluids in the lowermost contacting zone rises as a result of the influx of heavy fluid from the superadjacent plate into the heavy fluid layer, the ball float rises, forcing arm 115 to act on valve 116, opening the same and allowing extract to flow from the column through extract outlet conduit 109. As the interface level falls in the lowermost contacting zone, ball float 114 is lowered and through coaction with valve 116, restricts the flow of the liquid extract phase through extract outlet conduit 109.

A modification of the embodiment of the invention illustrated in Figure 3 is shown in Figure 4 wherein the mechanical interface level control means described for Figure 3 is dispensed with and a non-mechanical, simplified control means provided. In the latter method of control, the heavy liquid entering the lowermost contacting zone through conduit 112' flows from the lower end 113' of the downcomer, traverses the column substantially horizontally across the path of the rising droplets of light fluid redistributed through perforated partition 105' and overflows the wier provided by the upper end of conduit 109' which is also the extract outlet conduit from the column. It will be seen that within the limits of the flow capacity of conduit 109', the heavy liquid may be charged into the column at any rate and the heavy extract phase will overflow into the wier to maintain the interface level constant in the lowermost contacting zone as well as in each superimposed zone.

The extraction column is here illustrated as a vertical tubular column, but other forms of the apparatus are likewise utilizable in the process, including tank-like structures in which the longitudinal axis is horizontal, containing substantially horizontally disposed trays therein. Although the column is generally operated with the solvent phase comprising the phase of relatively greater density, thus entering the top of the column and flowing countercurrently downwardly through the column against a light feed stock phase entering the bottom of the column, the direction of flow of the respective liquids may be reversed and when the feed stock intended to be subjected to washing or extraction is the relatively denser phase, it is introduced into the top of the column as the dense phase and the solvent or washing fluid introduced into the bottom of the column as the liquid phase of least specific gravity. Furthermore, other liquid level following means or control devices other than the ball float apparatus illustrated on the diagram, may be employed in the column including various electronic or pneumatic liquid level sensing devices and control means commonly employed in the art at present.

Although the extraction process and apparatus of this invention have been described with reference to the use of an aqueous oxydiethylene glycol solution as the solvent, it is evident that other liquid extractants may likewise be utilized, provided the feed stock and solvent fluids differ in specific gravities or densities and provided, further, that the fluids are substantially immiscible in each other, thereby providing the conditions essential for the formation of an interface between the feed stock and solvent phases.

We claim as our invention:

1. In a process for countercurrently contacting a light fluid with a relatively dense liquid which is subsequently immiscible with the light fluid in a vertically elongated column having vertically spaced perforated partitions dividing the column into a plurality of contacting zones, the method which comprises introducing said dense liquids into the uppermost contacting zone for downward flow through the column, introducing said light fluid into the lowermost contacting zone for upward passage through the column, maintaining in each of the contacting zones a lower layer of the dense liquid and an upper layer of the light fluid separated by an interface therebetween, passing light fluid in subdivided form from the upper layer in each of said zones except the uppermost through the dense liquid layer in the next higher zone and then into the light fluid layer in the last-named zone, withdrawing dense liquid at the interface in each zone except the lowermost and passing the same downwardly through and out of contact with the dense liquid layer immediately below said interface and downwardly through and out of contact with the light fluid layer below the last-named dense liquid layer into the next lower dense liquid layer in the column, maintaining the interface in said lowermost zone at a substantially constant level whereby the interface in each of the upper zones remains at a substantially constant predetermined level, removing the contacted light fluid from said uppermost zone and from the column, and withdrawing the dense liquid from the lowermost zone and from the column.

2. The method of claim 1 further characterized in that the interface in the lowermost zone is maintained at a substantially constant level by controlling the rate of withdrawal of dense liquid from said zone.

3. The method of claim 2 further characterized in that said rate of withdrawal of dense liquid is controlled in response to variations in the interface level in the lowermost zone.

4. The method of claim 1 further characterized in that said light fluid is a hydrocarbon liquid and said relatively dense liquid comprises a solvent for components of the hydrocarbon liquid.

5. The method of claim 1 further characterized in that said light fluid is a petroleum distillate containing aromatic hydrocarbons and said relatively dense liquid is a selective solvent for said aromatic hydrocarbons.

6. The method of claim 5 further characterized in that said solvent is an aqueous oxydiethylene glycol solution.

7. A contacting apparatus comprising a vertically elongated column, vertically spaced, substantially horizontal perforated partitions dividing the column into a plurality of contacting zones, means for introducing liquid to and for removing fluid from the uppermost zone, means for introducing fluid to and removing liquid from the lowermost zone, an open-ended conduit extending substantially vertically through each of said partitions and comprising a riser portion extending into the contacting zone above the partition and a downcomer portion extending into the contacting zone below the partition, the open end of the riser portion of each conduit being at a higher elevation than the open end of the downcomer portion of the next higher conduit in the column, and interface level sensing means in said lowermost zone adapted to control liquid flow rate in response to variations in interface level between liquid and fluid in the lowermost zone.

GLEN R. GRUNEWALD.
FRED J. PIERCE.

References Cited in the file of this patent

UNITED STATES PATENTS

| Number | Name | Date |
|---|---|---|
| 1,782,735 | MacKenzie | Nov. 25, 1930 |
| 1,943,822 | Harrington | Jan. 16, 1934 |
| 1,951,787 | Child et al. | Mar. 20, 1934 |
| 2,248,220 | Dons et al. | July 8, 1941 |
| 2,361,780 | Lewis | Oct. 31, 1944 |
| 2,520,391 | Findly | Aug. 29, 1950 |